US008644261B1

(12) United States Patent
Vargantwar

(10) Patent No.: US 8,644,261 B1
(45) Date of Patent: Feb. 4, 2014

(54) METHODS AND SYSTEMS FOR REGISTERING A WIRELESS ACCESS TERMINAL WITH A RADIO ACCESS NETWORK

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 544 days.

(21) Appl. No.: 13/021,632

(22) Filed: Feb. 4, 2011

(51) Int. Cl.
*H04W 4/00* (2009.01)
*H04W 36/00* (2009.01)

(52) U.S. Cl.
USPC .......................................... 370/332

(58) Field of Classification Search
None
See application file for complete search history.

(56) References Cited

U.S. PATENT DOCUMENTS

| | | | |
|---|---|---|---|
| 5,289,527 A | 2/1994 | Tiedemann, Jr. | |
| 5,394,158 A | 2/1995 | Chia | |
| 5,588,043 A | 12/1996 | Tiedemann, Jr. et al. | |
| 7,769,380 B2 | 8/2010 | Abu-Amara | |
| 7,792,535 B2 | 9/2010 | Benco et al. | |
| 7,801,525 B2 | 9/2010 | Benco et al. | |
| 7,848,876 B2 | 12/2010 | Simonds et al. | |
| 2006/0133269 A1* | 6/2006 | Prakash et al. | 370/229 |
| 2006/0198344 A1 | 9/2006 | Teague et al. | |
| 2006/0199596 A1 | 9/2006 | Teauge et al. | |
| 2007/0032234 A1* | 2/2007 | Jain et al. | 455/435.1 |
| 2008/0153483 A1* | 6/2008 | Abu-Amara | 455/432.1 |
| 2008/0207227 A1 | 8/2008 | Ren et al. | |
| 2009/0258648 A1 | 10/2009 | Willey | |
| 2010/0081436 A1 | 4/2010 | Kubo et al. | |
| 2010/0099417 A1* | 4/2010 | Cho | 455/443 |
| 2010/0246467 A1 | 9/2010 | Song et al. | |
| 2011/0195714 A1* | 8/2011 | Sawinathan | 455/435.1 |

OTHER PUBLICATIONS

Dr. Math, The Math Form @ Drexel, Bearing Between Two Points, Dec. 19, 2001, downloaded from the world wide web at http://mathforum.org/library/drmath/view/55417.html.
Chris Veness, Calculate distance, bearing and more between two latitude/longitude points, downloaded from the world wide web at http://www.ig.utexas.edu/outreach/googleearth/latlong.html on Dec. 29, 2010.
Ed Williams, Aviation Formularly V1.45, downloaded from the world wide web at http://williams.best.vwh.net/avform.htm on Dec. 29, 2010.
Great-circle distance, downloaded from the world wide web at http://en.wikipedia.org/wiki/Great_circle_distance on Dec. 23, 2010.

(Continued)

*Primary Examiner* — Chirag Shah
*Assistant Examiner* — Ashley Shivers

(57) ABSTRACT

A method and system for determining whether an access terminal will perform a hand off to a target base station (BS) or register with a currently-serving BS and thereafter hand off to the target BS. In making that determination, the access terminal may make and compare pilot signal strength measurements. For a target BS transmitting a pilot signal detected to be stronger than a pilot signal transmitted by the currently-serving BS, the access terminal determines whether a distance between the target BS and a currently-registered BS exceeds a registration distance associated with the currently-registered BS. If the registration distance is exceeded, the access terminal registers with the currently-serving BS prior to handing off to the target BS such that the access terminal is more likely to receive page messages directed to the access terminal while it is registering with the currently-serving BS and handing off to the target BS.

25 Claims, 10 Drawing Sheets

(56) References Cited

OTHER PUBLICATIONS

Bearing (navigation), downloaded from the world wide web at http://en.wikipedia.org/wiki/Bearing_(navigation) on Dec. 23, 2010.

Re: Excel Formula for determining azimuth relative to true north between two sets of geographic coordinates?, downloaded from the world wide web at http://www.tech-archive.net/Archive/Excel/microsoft/public.excel/2005-09/msg01840.html, Sep. 2005.

Jang Hyun Baek, et al., Performance evaluation of an enhanced distance-based registration scheme using the normal distribution approximation, 2004.

Chris Veness and Greg Molenaar, Calculate distance, bearing, etc. between 2 Latitude/Longitude points, downloaded from the world wide web at http://www.yourhomenow.com/house/haversine.html on Dec. 27, 2010.

Chris Veness, Calculate distance, bearing and more between latitude/longitude points, downloaded from the world wide web at http://www.movable-type.co.uk/scripts/latlong.html, Jan. 2010.

Distance and bearing between latitude/longitude points, downloaded from the world wide web at http://zakmetz.com/, Sep. 16, 2010.

Scott Baxter, 1xEV-DO Reverse Link: Soft Handoff, Course Series 340v6.0, Jul. 2008.

Kevin Standiford, Descriptive Geometry: An Integrated Approach Using AutoCAD, Chapter Two, Points and Lines, Thomson Delmar Learning, 2006.

Telecommunications Industry Association, TIA/EIA Interim Standard, Upper Layer (Layer3) Signaling Standard for cdma2000 Spread Spectrum Systems, Release C, TIA/EIA/IS-2000.5-C, May 2002.

* cited by examiner

METHODS AND SYSTEMS FOR REGISTERING A WIRELESS ACCESS TERMINAL WITH A RADIO ACCESS NETWORK

BACKGROUND

Access terminals, such as cell phones and wireless personal digital assistants (PDAs), are operable to communicate with radio access networks, such as cellular wireless networks. The access terminals and access networks typically communicate with each other over a radio frequency (RF) air interface according to a wireless protocol such as 1x Evolution Data Optimized (1x Ev-DO), perhaps in conformance with one or more industry specifications such as IS-856, Revision 0, IS-856, Revision A, and IS-856, Revision B. Other wireless protocols, such as Code Division Multiple Access (CDMA), Global System for Mobile Communications (GSM), or Time Division Multiple Access (TDMA), may be used as well.

Access networks typically provide services such as voice, text messaging (such as Short Message Service (SMS) messaging), and packet-data communication, among others. Access networks typically include a plurality of base stations, each of which forms one or more coverage areas, such as cells and sectors (that is, individual areas of a cell that allow the cell to carry more calls). When an access terminal is positioned in one of these coverage areas, it can communicate over the air interface with the base station, and in turn over a signaling network or a transport network, or both. The signaling network may be a circuit-switched network, a packet-switched network or a combination of both. Similarly, the transport network may be a circuit-switched network, a packet-switched network or a combination of both.

Access terminals and access networks may conduct communication sessions (for example, voice calls and data sessions) over a pair of frequencies known as carriers, with a base station of an access network transmitting to an access terminal on one of the frequencies, and the access terminal transmitting to the base station on the other. This is known as frequency division duplex (FDD). The carriers may be segmented into various channels, such as pilot channels, sync channels, paging channels, control channels, traffic channels, and access channels. A base station to access terminal communication link is known as the forward-link, whereas an access terminal to base station communication link is known as the reverse-link.

Using paging channels, the radio access network can transmit paging messages destined for an access terminal based on where the access terminal is registered within the radio access network. In some cases, such as when an access terminal is handing over from one base station to another base station in order to register with the other base station, the access terminal may not receive paging messages destined for the access terminal because the access ten final is located outside of a paging area in which the paging messages are transmitted. Transmitting messages in a paging area in which the access terminal is not located can unnecessarily increase congestion on the paging channels in the paging area.

Overview

Carrying out the example embodiments of the present invention may lead to an increased likelihood that an access terminal will receive a paging message destined for the access terminal, and reduced congestion on paging channels of at least a portion of a paging area in which the access terminal is not located.

In one respect, an example embodiment may be arranged as a method comprising: (i) an access terminal registering with a first base station, (ii) while the access terminal is registered with the first base station, the access terminal performing an idle-mode handoff to a second base station, (iii) while the access terminal is registered with the first base station and while the second base station is a currently-serving base station for the access terminal, the access terminal detecting that a strength of a pilot signal transmitted by a third base station exceeds, by at least a handoff threshold, a strength of a pilot signal transmitted by the second base station, (iv) the access terminal comparing a distance between the first base station and the third base station to a registration distance associated with the first base station, and (v) if the access terminal determines that the distance between the first base station and the third base station is greater than or equal to the registration distance associated with the first base station, then the access terminal registering with the second base station, otherwise, if the access terminal determines that the distance between the first base station and the third base station is less than the registration distance associated with the first base station, then the access terminal performing an idle-mode handoff from the second base station to the third base station.

In another respect, an example embodiment may take the form of an access terminal comprising: (i) a radio frequency (RF) transceiver that is operable to transmit communications to register the access terminal with a first base station, (ii) a processor, and (iii) a data storage device that contains computer-readable program instructions and a registration distance associated with the first base station. While the access terminal is registered with the first base station, the access terminal is operable to perform an idle-mode handoff to a second base station. While the access terminal is registered with the first base station and the second base station is a currently-serving base station for the access terminal, the processor is operable to execute computer-readable program instructions to detect that a strength of a pilot signal received by the RF transceiver from a third base station exceeds, by at least a handoff threshold, a strength of a pilot signal received by the RF transceiver from the second base station. The computer-readable program instructions are executable by the processor to compare the distance between the first base station and the third base station to the registration distance associated with the first base station. If the processor determines that the distance between the first base station and the third base station is greater than or equal to the registration distance associated with the first base station, then the processor triggers the RF transceiver to transmit communications to register the access terminal with the second base station, otherwise, if the processor determines that the distance between the first base station and the third base station is less than the registration distance associated with the first base station, then the processor triggers the access terminal to perform an idle-mode handoff from the second base station to the third base station.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which.

DETAILED DESCRIPTION

I. Introduction

Figure 1:
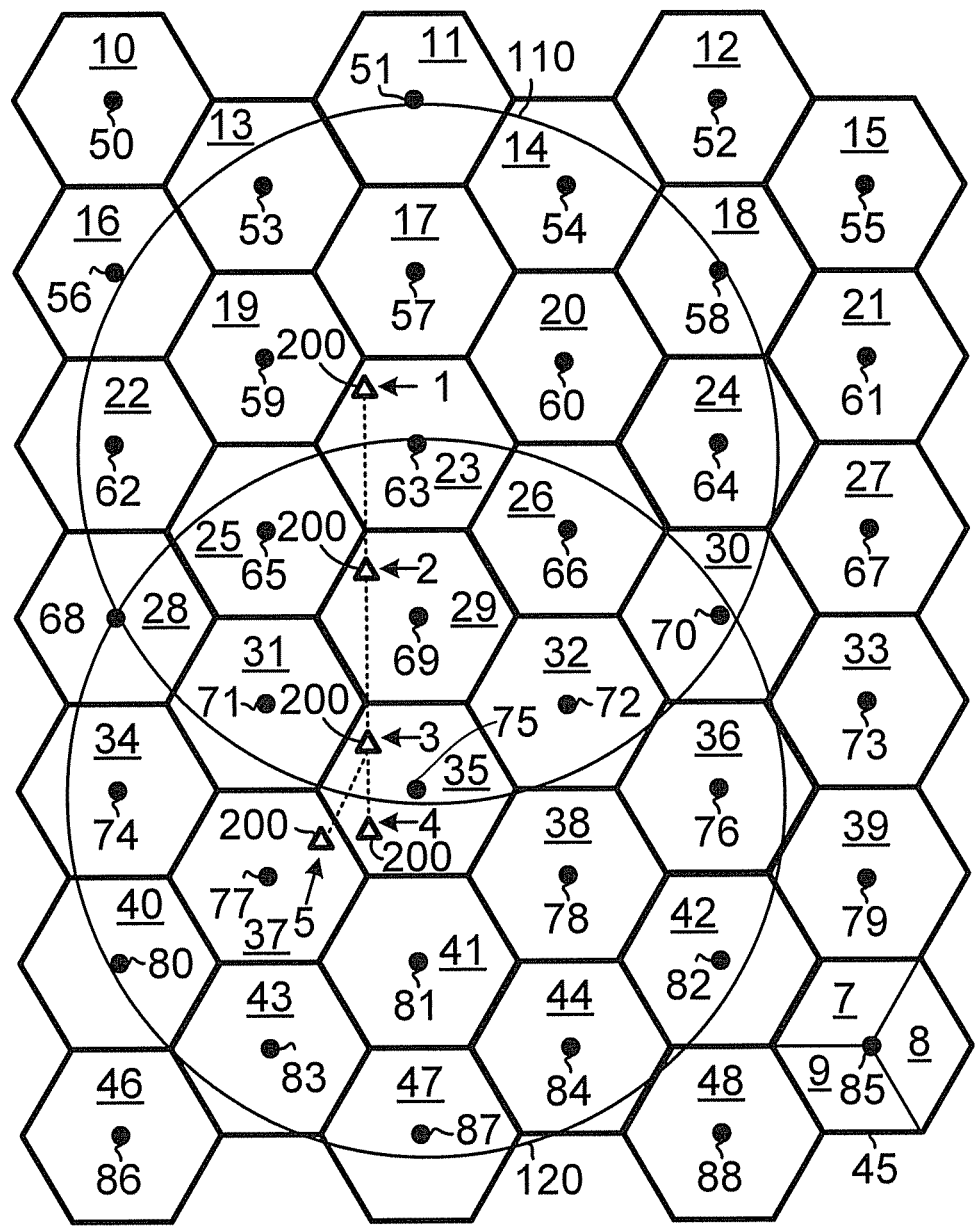
FIG. 1 is a diagram of a radio access network in accordance with the example embodiments.

This description describes details of example embodiments of the present invention. In general, the example embodiments pertain to wireless access terminals (or more simply, access terminals) registering with a radio access network and, in particular, to access terminals performing distance-based registration with a radio access network. Although distance-based registration with a radio access network is more likely to be carried out by an access terminal that is in motion as compared to an access terminal that is stationary, the example embodiments may be performed via and/or in conjunction with an access terminal that is in motion and with an access terminal that is stationary.

Registration is the process by which a base station and/or the radio access network is provided with information regarding an access terminal. The information regarding the access terminal may include, for example, a location of the access terminal, a status of the access terminal, identification of the access terminal, a slot cycle of the access terminal (that is, the slot of the paging channel that the access terminal monitors), and other characteristics of the access terminal. The radio access network can use the information received during the registration process to determine which base stations of the radio access network should transmit paging messages to the access terminal. For purposes of this description, the base station the access terminal is currently registered with is sometimes referred to as the "currently-registered base station."

The example embodiments also pertain to performance of idle-mode handoffs from one coverage area (e.g., a cell or sector) to another coverage area. As the access terminal moves between different coverage areas formed by a single base station or by multiple base stations of a radio access network, the access terminal may handoff from one sector of the base station to another sector of the base station or from one base station to another base station, respectively. For purposes of this description, prior to performing the handoff, the sector and base station from which the access terminal will be handed off are referred to as the "currently-serving sector" and the "currently-serving base station," respectively, and the sector and base station to which the access terminal will be handed off are referred to as the "target sector" and the "target base station," respectively.

A person having ordinary skill in the art will understand that the currently-registered base station and the currently-serving base station could be one and the same, and that person will further understand that the currently-registered base station and the target base station could be one and the same.

An idle-mode handoff occurs while the access terminal is operating in an idle-mode. While operating in the idle mode, the access terminal monitors paging channel(s) and/or control channel(s) being transmitted from the currently-serving sector and/or the currently-serving base station. Furthermore, while operating in the idle mode, the access terminal can determine strengths of pilot signals transmitted by the currently-serving base station and other base stations, such as base stations adjacent to the currently-serving base station. A target sector and/or the target base station transmits a pilot signal that is determined by the access terminal as being stronger, by at least a handoff threshold, than the pilot signal of the currently-serving sector and/or base station.

In accordance with the example embodiments, the access terminal determines a distance between a currently-registered base station (e.g., BS #1) and a target base station (e.g., BS #3) while a currently-serving base station (e.g., BS #2) is serving the access terminal, and the access terminal compares that determined distance to a registration distance associated with the currently-registered base station (e.g., BS #1). If the determined distance is greater than the registration distance, the access terminal registers with the currently-serving base station (e.g., BS #2) and thereafter the access terminal may handoff from the currently-serving base station (e.g., BS #2) to the target base station (e.g., BS #3).

A benefit of registering with the currently-serving base station (e.g., BS #2) is that the access terminal is registering with a base station that can be close enough to the target base station (e.g., BS #3) such that the distance between the currently-serving base station (e.g., BS #2) and the target base station (e.g., BS #3) does not exceed a registration distance associated with the currently-serving base station (e.g., BS #2). If the radio access network needs to page the access terminal after the access terminal registers with the currently-serving base station (e.g., BS #2), the paging message could be transmitted by the currently-serving base station (e.g., BS #2) and the target base station (e.g., BS #3). In that way, the access terminal can receive the paging message from a currently-serving base station, whether it be the new currently-registered base station (e.g., BS #2) or the base station (e.g., BS #3) that was the target base station when the access terminal registered with the currently-serving base station (e.g., BS #2).

Another benefit of registering with the currently-serving base station (e.g., BS #2) is that base stations located more than the registration distance away from the new currently-registered base station (e.g., BS #2) but located within the registration distance of the previously-registered base station (e.g., BS #1) will not transmit paging messages to the access

II. Example Architecture

FIG. 1 is a diagram illustrating an example radio access network 100 in accordance with the example embodiments. Radio access network 100 includes a plurality of base stations. Each of those base stations is represented by a filled-in circle and is identified by a respective number of the numbers between and including 50 and 88. Each base station of radio access network 100 forms a particular coverage area (e.g., a cell and/or sector) of radio access network 100 by transmitting radio frequency (RF) signals away from the base station.

In FIG. 1, each of the coverage areas is represented by a hexagon and is identified by a respective number of the numbers between and including 10 and 48. Although each of the coverage areas is represented as a hexagon, a person having ordinary skill in the art will understand that one or more of the coverage areas may be arranged as a shape other than a hexagon. Furthermore, two or more of coverage areas in radio access network 100 may have portions that overlap with one or more other coverage areas, and one or more coverage areas in radio access network 100 may be partitioned into multiple sectors. By way of example, coverage area 45 is partitioned into three sectors, namely, sectors 7, 8, and 9.

The RF signals transmitted by each base station or sector may be received by wireless access terminals operating within a coverage area formed by that base station. The RF signals transmitted by each base station or sector may include a pilot signal comprising an un-modulated signal that is continuously transmitted at a fixed power. The RF signals transmitted by each base station may also include data associated with that base station, such as location and registration distance data associated with that base station. The location data may comprise data that identifies a latitude and longitude of the base station.

The registration distance data may comprise data that identifies a distance measured in miles, kilometers, or some other units. By way of example, the registration data for a given base station may indicate that the registration distance for that base station is 10 miles (16.09 kilometers). The registration distance data associated with a given base station identifies a distance boundary around the given base station. FIG. 1 illustrates a distance boundary 110 that is associated with base station 63 and a distance boundary 120 that is associated with base station 75. Each of the other base stations in FIG. 1 may also be associated with a respective distance boundary, but those distance boundaries are not illustrated in order to maintain the clarity of FIG. 1.

Distance boundary 110 identifies which base stations may transmit paging messages to access terminal 200 if access terminal 200 is registered with base station 63 and if radio access network 100 determines that access terminal 200 is to be paged. The base stations of distance boundary 110 include base stations 11, 13, 14, 17, 18, 19, 20, 22, 23, 24, 25, 26, 28, 29, 30, 31, 32, and 35. The paging area formed by those base stations may be larger than distance boundary 110 and take a shape different than distance boundary 110.

Similarly, distance boundary 120 identifies which base stations may transmit paging messages to access terminal 200 if access terminal 200 is registered with base station 75 and if radio access network 100 determines that access terminal 200 is to be paged. The base stations of distance boundary 120 include base stations 23, 25, 26, 28, 29, 30, 31, 32, 34, 35, 36, 37, 38, 40, 41, 42, 43, 44, and 47. The paging area formed by those base stations may be larger than distance boundary 120 and take a shape different than distance boundary 120.

Figure 2:
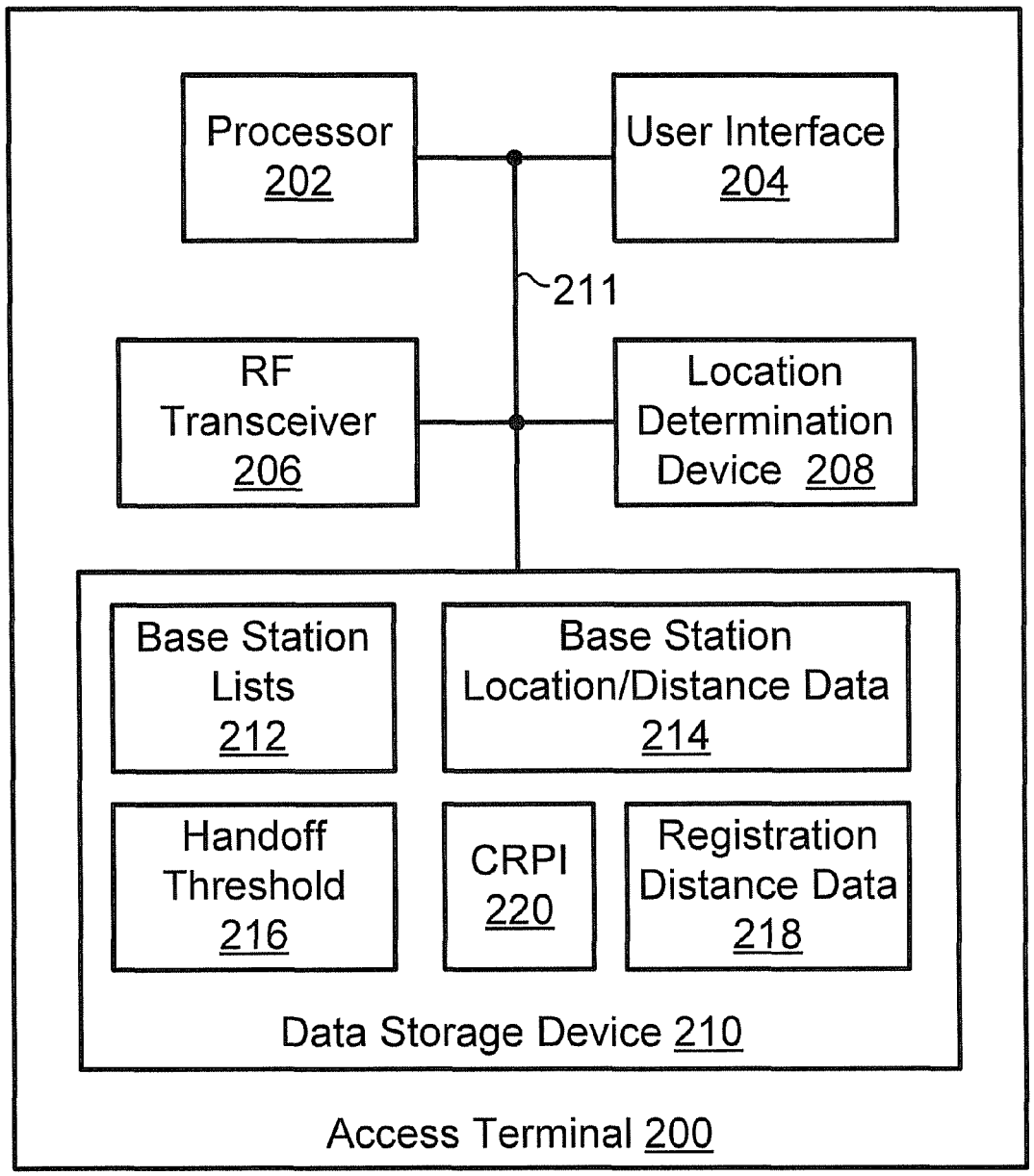
FIG. 2 is a block diagram of an access terminal in accordance with the example embodiments.

FIG. 1 illustrates example paths (the dashed lines) of a mobile access terminal 200 operating within radio access network 100. Details of access terminal 200 are illustrated in FIG. 2. The triangles in FIG. 1 represent various locations 1, 2, 3, 4, and 5 of access terminal 200 as it travels along the paths within radio access network 100. On one of those paths, access terminal 200 travels from location 1 to location 2, from location 2 to location 3, and then from location 3 to location 4. On the other path, access terminal 200 travels from location 1 to location 2, from location 2 to location 3, and then from location 3 to location 5.

By way of example, access terminal 200 may register with base station 63, such that base station 63 becomes a currently-registered base station for access terminal 200. While registered with base station 63 and while operating in coverage area 23, base station 63 may operate as a currently-serving base station for access terminal 200.

Access terminal 200 may operate in various modes, one of which includes an idle-mode.

Access ten Anal 200 may perform various functions while operating in the idle-mode. For example, access terminal 200 may monitor and compare strengths of pilot signals received at access terminal 200 from various base stations. As another example, access terminal 200 may determine that a strength of a pilot signal transmitted by a base station, other than a currently-serving base station, is greater than, less than or equal to a strength of a pilot signal transmitted by the currently-serving base station for access terminal 200. As yet another example, access terminal 200 may determine a distance between base stations that transmit the pilot signals received by access terminal 200.

As access terminal 200 moves from location 1 to location 2, access terminal 200 may compare the strength of the pilot signal transmitted from base station 63 to the strength of the pilot signals transmitted from base stations adjacent to base station 63, such as base station 69. If access terminal 200 detects that the strength of the pilot signal transmitted from base station 63 is greater than the strengths of the other pilot signals, access terminal 200 may continue to be served by base station 63.

On the other hand, if access terminal 200 detects that the strength of the pilot signal transmitted from base station 63 is less than the strength of the pilot signal transmitted by base station 69, then access terminal 200 may determine the distance between base stations 23 and 29 and compare that distance to a registration distance associated with base station 63. As shown in FIG. 1, the distance between base stations 23 and 29 is less than the registration distance (e.g., the radius of distance boundary 110) associated with base station 63. Accordingly, if access terminal 200 is operating in the idle-mode, access terminal 200 performs an idle-mode handoff to base station 69. That idle-mode handoff may occur as access terminal 200 is approaching coverage area 29 or as it is transported within coverage area 29. Upon performing the idle-mode handoff to base station 69, base station 69 replaces base station 63 as the currently-serving base station. When the strength of the detected pilot signals are equal, the access terminal 200 may be arranged to handoff to another base station or to remain being served by the currently-serving base station.

As access terminal 200 moves from location 2 to location 3, access terminal 200 may compare the strength of the pilot signal transmitted from base station 69 to the strength of the pilot signals transmitted from base stations adjacent to base station 69, such as base station 75. If access terminal 200 detects that the strength of the pilot signal transmitted from base station 69 is greater than the strengths of the other pilot signals, access terminal 200 may continue to be served by base station 69.

On the other hand, if access terminal 200 detects that the strength of the pilot signal transmitted from base station 69 is less than the strength of the pilot signal transmitted by base station 75, then access terminal 200 may determine the distance between base station 63 (i.e., the currently-registered base station) and base station 75 and compare that distance to the registration distance associated with base station 63. As shown in FIG. 1, the distance between base stations 23 and 35 is less than the registration distance (e.g., the radius of distance boundary 110) associated with base station 63. Accordingly, if access terminal 200 is operating in the idle-mode, access terminal 200 may perform an idle-mode handoff to base station 75. That idle-mode handoff may occur as access terminal 200 is approaching coverage area 35 or as it is transported within coverage area 35. Upon performing the idle-mode handoff to base station 75, base station 75 replaces base station 69 as the currently-serving base station.

As access terminal 200 moves from location 3 to location 4, access terminal 200 may compare the strength of the pilot signal transmitted from base station 75 to the strength of the pilot signals transmitted from base stations adjacent to base station 75, such as base stations 69, 71, 72, 77, 78, and 81. If access terminal 200 detects that the strength of the pilot signal transmitted from base station 75 is greater than the strengths of the other pilot signals, access terminal 200 may continue to be served by base station 75.

On the other hand, if access terminal 200 detects that the strength of the pilot signal transmitted from base station 75 is less than the strength of the pilot signal transmitted by another base station, then access terminal 200 may determine the distance between base station 63 and that other base station and compare that distance to a registration distance associated with base station 63. If that other base station is within boundary distance 100 and if access terminal 200 is operating in the idle mode, then access terminal 200 performs an idle-mode handoff to the other base station, otherwise access terminal 200 registers with base station 75 and thereafter may perform the idle-mode handoff to the other base station.

In the alternative path, access terminal 200 moves from location 3 to location 5. While traveling along that path, access terminal 200 may compare the strength of the pilot signal transmitted from base station 75 to the strength of the pilot signals transmitted from base stations adjacent to base station 75, such as base station 77. If access terminal 200 detects that the strength of the pilot signal transmitted from base station 75 is greater than the strengths of the other pilot signals, access terminal 200 may continue to be served by base station 75.

On the other hand, if access terminal 200 detects that the strength of the pilot signal transmitted from base station 75 is less than the strength of the pilot signal transmitted by base station 77, then access terminal 200 may determine the distance between base stations 63 and 77 and compare that distance to a registration distance associated with base station 63. As shown in FIG. 1, the distance between base stations 63 and 77 is greater than the registration distance (e.g., the radius of distance boundary 110) associated with base station 63. If access terminal 200 is operating in the idle-mode, access terminal 200 registers with the currently-serving base station (i.e., base station 75) and thereafter performs an idle-mode handoff from base station 75 to base station 77. That idle-mode handoff may occur as access terminal 200 is approaching coverage area 77 or as it is transported within coverage area 37. Upon registering with base station 75, base station 75 replaces base station 63 as the currently-registered base station. Upon performing the idle-mode handoff to base station 77, base station 77 replaces base station 75 as the currently-serving base station.

Next, FIG. 2 is a block diagram of access terminal 200 in accordance with the example embodiments. By way of example, access terminal 200 may be arranged as a wireless communication device, such as a cellular telephone, a personal digital assistant (PDA), a laptop personal computer, or some other wireless communication device that can access and operate within radio access network 100.

It should be understood that the block diagram of FIG. 2 and the other diagrams and flow charts are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements may be carried out by a processor executing computer-readable program instructions and/or by any combination of hardware, firmware, and software.

Access terminal 200 may operate in any of a variety of modes including, but not limited to, an initialization mode, an idle mode, an access mode, and an access terminal control on traffic channel mode. In the initialization mode, access terminal 200 may acquire, from a base station, a pilot signal and system configuration and timing information. In the idle mode, access terminal 200 may monitor pilot signals from a plurality of base stations and/or sectors, monitor forward common and broadcast channels of a currently-serving base station, register access terminal 200 with a base station other than a currently-registered base station, and perform an idle-mode handoff from a currently-serving base station to a target base station, thus making that currently-serving base station a previous-serving base station and making the target base station a currently-serving base station. In the access mode, access terminal 200 may monitor forward-link channels for updates on overhead messages and it may transmit messages via a reverse-link to originate a communication session, such as a voice call. In the access terminal control on traffic channel mode, access terminal 200 and a currently-serving base station communicate via forward-link and reverse-link traffic channels. Other examples of functions access terminal 200 may carry out while operating in any of the foregoing modes of access terminal 200 are also possible.

As illustrated in FIG. 2, access terminal 200 includes a processor 202, a user interface 204, a radio frequency (RF) transceiver 206, a location determination device 208, and a computer-readable data storage device 210, all of which may be linked together via a system bus, network, or other connection mechanism 211.

Processor 202 may comprise one or more general purpose processors (for example, INTEL microprocessors) and/or one or more special purpose processors (for example, digital signal processors). Processor 202 is operable to execute computer-readable program instructions, such as computer-readable program instructions (CRPI) 220.

User interface 204 may be arranged as a plurality of devices that are operable to present data to a user of access terminal 200 and/or to allow a user to enter data into access terminal 200. As an example, user interface 204 may comprise a display that is operable to visually present data to the user and/or a loud speaker that is operable to audibly present data to the user. As another example, user interface 204 may comprise a microphone that is operable by the user to enter audible data into access terminal 200 and/or a keyboard having one or more keys that are operable to present other data into access terminal 200. One of the keys on the keyboard may include a key that is operable to cause mobile device to 200 to power on if access terminal 200 is powered off and to power off if access terminal 200 is powered on.

RF transceiver 206 may be arranged in various configurations to transmit RF communications to base stations and to receive RF communications from the base stations. The RF communications received by RF transceiver 206 may be provided to processor 202 for further processing. The further processing may include, for example, determining a strength of pilot signals received by RF transceiver 206, providing base station location data to data storage device 210 for storage as base station location/distance data 214, and providing communication session data (e.g., voice communications) to user interface 204. The RF communications transmitted by RF transceiver 206 may include information regarding access terminal 200 so that access terminal 200 can register with another base station. As an example, the RF communications transmitted by RF transceiver 206 may be communicated according to the CDMA protocol and the communications received by RF transceiver 206 may be communicated according to the 1x Ev-DO protocol.

Location determination device 208 may comprises a global positioning system (GPS) receiver and antenna for receiving signals transmitted from GPS satellites. Location determination device 208 may be operable to determine location information associated with the current location of access terminal 200. That location information may include a latitude, longitude, and elevation of access terminal 200. Location determination device 208 may provide location information to other elements of access terminal 200, such as processor 202, user interface 204, and data storage device 210.

Data storage device 210 may comprise a computer-readable storage medium readable by processor 202. The computer-readable storage medium may comprise volatile and/or non-volatile storage components, such as optical, magnetic, organic or other memory or disc storage, which can be integrated in whole or in part with processor 202.

Data storage device 210 may contain various data. As illustrated in FIG. 2, data storage device 210 contains base station lists 212, base station location/distance data 214, a handoff threshold 216, registration distance data 218, and computer-readable program instructions (CRPI) 220.

Base station lists 212 may comprise computer-readable data that indicates various sets of pilot offsets transmitted by base stations, including an active set of pilot offsets of pilot signals that access terminal 200 is actively demodulating, a candidate set of pilot offsets of pilot signals that are strong enough to be considered for handoff but are not being demodulated by access terminal 200, and a neighbor set of pilot offsets of the pilot signals in sectors that neighbor the currently-serving base station or sector but which are not in the active or candidate sets. A candidate base station transmits a pilot signal of the candidate set of pilot offsets. A candidate base station that is determined to be a base station to which access terminal 200 will hand off is a target base station. Access terminal 200 can use base station lists 212 to determine which pilot signals to demodulate and to carry out a pilot signal strength measurement.

Base station location/distance data 214 comprises computer-readable data that indicates locations of one or more base stations and distances between those one or more base stations. The base stations for which location data is stored may include a currently-registered base station, a currently-servicing base station, and one or more candidate base stations, such as a target base station. As an example, the location of each base station may be specified as a particular latitude and a particular longitude.

The base station distance data may be determined from the base station location data. As an example, either of equations 1 and 2 below, implemented in computer-readable program instructions 220, may be used to determine the distance between two base stations.

$$\text{Distance}=((\Delta lat)^2+(\Delta long)^2)^{1/2} \div 16. \quad (1)$$

$$\text{Distance}=((\Delta lat)^2+(\Delta long)^2)^{1/2}). \quad (2)$$

In the foregoing equations, by way of example, $$\Delta lat = \text{latitude of a candidate base station–latitude of the currently-registered base station; and} \quad (3)$$

$$\Delta long = \text{(longitude of a candidate base station–longitude of the currently-registered base station)} \times \\ \text{COSINE}(\Pi \div 180 \times \text{latitude of the currently-registered base station} \div 14,400); \quad (4)$$

where the latitude of a candidate base station, the latitude of the currently-registered base station, the longitude of a candidate base station, and the longitude of the currently-registered base station are measured in degrees. A person having ordinary skill in the art will understand that other equations may be used to determine the distance between two base stations.

Handoff threshold 216 comprises computer-readable data that indicates a threshold for comparing to a difference in pilot signal strength measurements. Handoff threshold 216 preferably has the same units (for example, decibels (dB)) as the units of the pilot signal strength measurements. The strength of a pilot signal may be expressed as a signal-to-noise ratio $E_c/I_o$ that is measured in dB. In one respect, handoff threshold 216 may comprise a fixed handoff threshold. The fixed handoff threshold could be stored in data storage device 210 at the time access terminal 200 is being manufactured.

In another respect, handoff threshold 216 may comprise a dynamic handoff threshold that changes based on conditions of radio access network 100. For example, if coverage areas of cells or sectors surrounding a currently-serving base station are experiencing high traffic channel usage, handoff threshold 216 may be increased such that access terminal has to move further away from the currently-serving base station before it hands off to another base station or registers with currently-serving base station. As another example, if coverage areas of cells surrounding a currently-serving base station are experiencing low traffic channel usage, handoff threshold 216 may be decreased such that access terminal does not have to move as far away from the currently-serving base station before it hands off to another base station or registers with currently-serving base station.

Registration distance data 218 comprises computer-readable data that indicates a distance associated with a base station. Registration distance data 218, may be received by RF transceiver 206, while access terminal 200 is registering with a base station. In that regard, registration distance data 218 may be updated/modified each time access terminal 200 registers with a base station. Registration distance data 218 can be specified in any of a variety of units, such as miles, kilometers, or some other units. Registration distance data 218 can be compared to a distance between two base stations. Two or more base stations in radio access network 100 may have a common registration distance. Two or more base stations in radio access network 100 may have different registration distances.

Computer-readable program instructions (CRPI) 220 comprise various program instructions that are executable by processor 202. CRPI 220 may comprise program instructions that are executable to cause processor 202 to determine a strength of a pilot signal received by RF transceiver 206. Execution of those program instructions may result in performing a respective pilot signal strength measurement for each of one or more pilot signals received by RF transceiver 206.

CRPI 220 may comprise program instructions that are executable to cause processor 202 to compare the strengths of two pilot signals received and measured by access terminal 200 (for example, two pilot signal strength measurements). As an example, the pilot signals may be those transmitted by a currently-serving base station and a candidate base station, which may be a target base station.

CRPI 220 may comprise program instructions that are executable to cause processor 202 to determine a distance between two base stations. Execution of those program instructions may, for example, include solving one or more of equations (1), (2), (3), and (4).

CRPI 220 may comprise program instructions that are executable to cause RF transceiver 206 to compare a registration distance associated with a currently-registered base station to a distance between the currently-registered base station and a candidate base station so as to determine whether the distance between the currently-registered base station and a candidate base station is greater than, less than or equal to the registration distance. Additionally, CRPI 220 may comprise other programs instructions to carry out the functions described in this specification as being carried out by access terminal 200.

Figure 3:
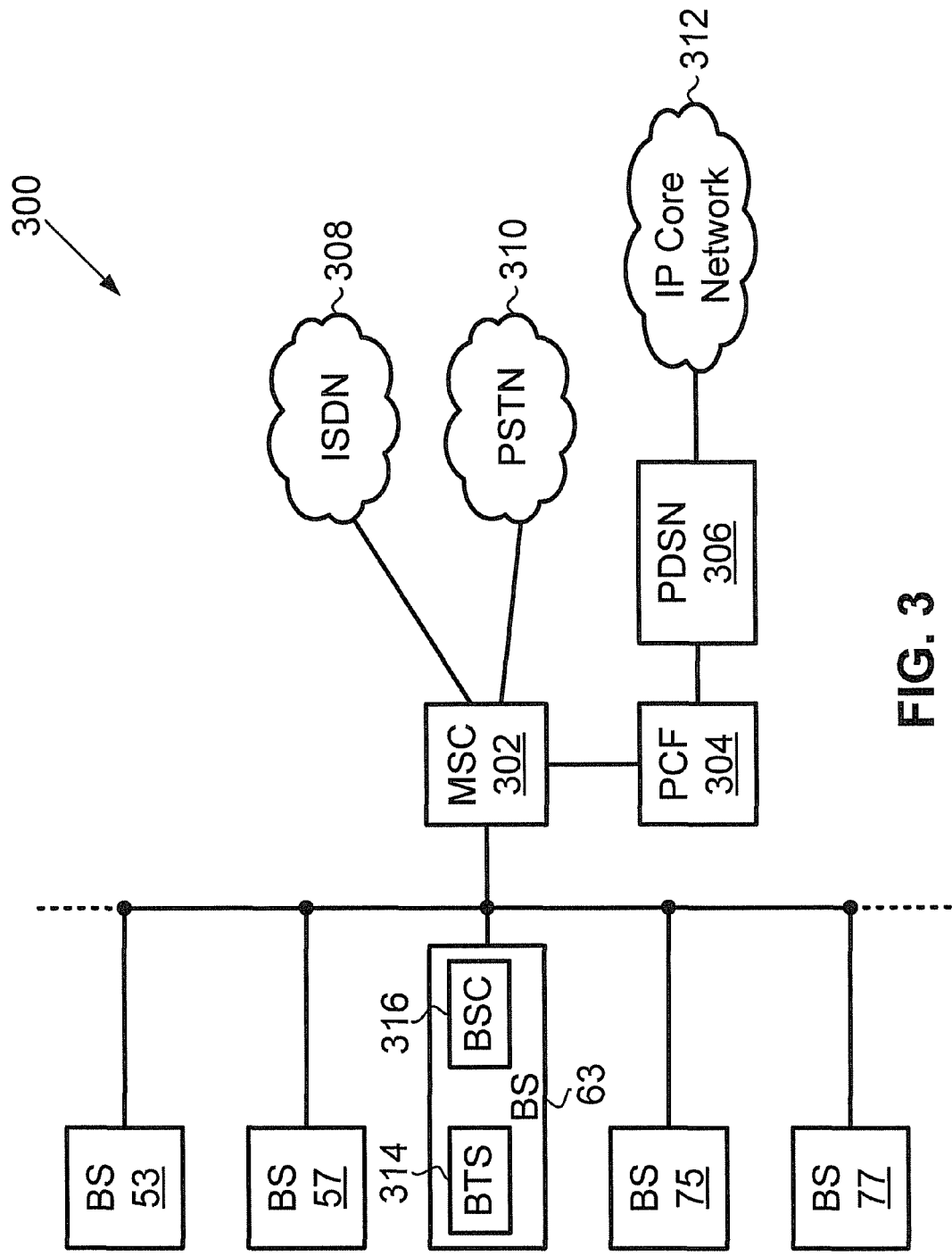
FIG. 3 is a block diagram of a system in accordance with the example embodiments.

Next, FIG. 3 is a block diagram of a system 300 in accordance with the example embodiments of this description. System 300 may include radio access network 100. In that regard, the left-hand side of system 300 illustrates base stations 53, 57, 63, 69, and 75 of radio access network 100. System 300 also includes a mobile switching center (MSC) 302, a packet control function (PCF) 304, a packet data serving node (PDSN) 306, an Integrated Services Digital Network (ISDN) 308, a public switched telephone network (PSTN) 310, and an Internet Protocol (IP) core network 312. ISDN 308, PSTN 310, and IP core network 312 are examples of transport networks that can carry out communications to and from radio access network 100 and the access terminals accessing radio access network 100.

MSC 302 is a switch that is operable to connect the base stations of radio access network 100 to other elements of system 300. PCF 304 can establish, maintain, and terminate connections to PDSN 306. PCF 304 can also buffer and relay packets of packet data communications between a base station and PDSN 306. PDSN 306 is operable to manage point-to-point protocol (PPP) sessions between access terminals of radio access network 100 and devices of IP core network 312 or some other network.

As illustrated in FIG. 3, base station 63 includes a base transceiver station (BTS) 314 and a base station controller (BSC) 316. BSC 316 is operable to control and manage BTS 314 and one or more other base transceiver stations and to exchange messages with MSC 302 and each BTS connected to BSC 316. Each BTS may comprise one or more RF transceivers and one or more antennas for transmitting RF signals to provide a coverage area and for receiving RF signals transmitted from access terminals operating in the coverage area provided by the BTS.

III. Example Operation

Figure 4:
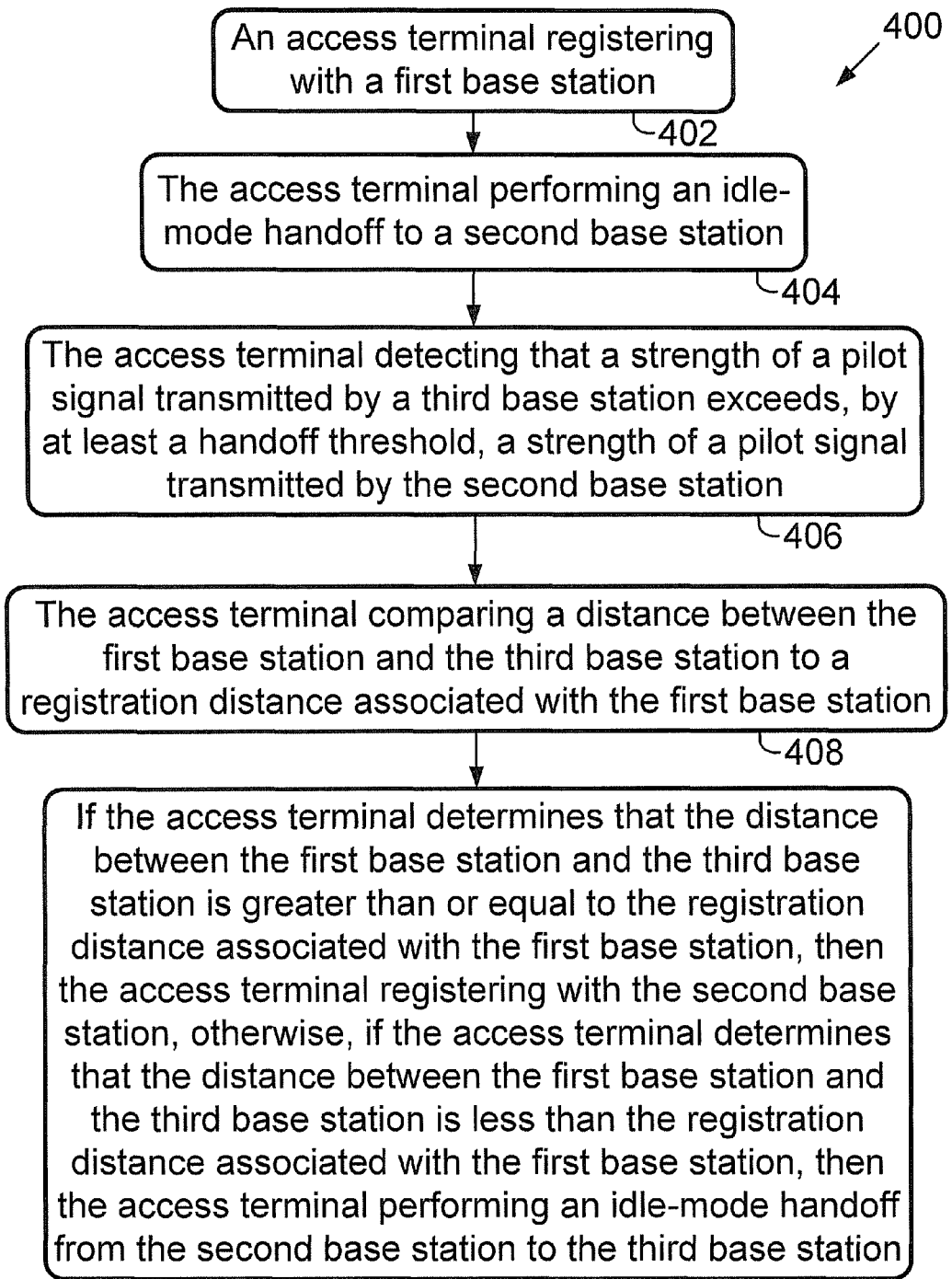
FIG. 4 is a flow chart depicting a set of functions that may be carried out in accordance with the example embodiments.

Next, FIG. 4 illustrates an example set of functions 400 that can be carried out in accordance with the example embodiments. The set of functions 400 refers to an access terminal, a first base station, a second base station, and a third base station. For purposes of describing FIG. 4, those elements referred to in FIG. 4 are referred to as access terminal 200, base station 63, base station 75, and base station 71 or 77, respectively.

Block 402 includes an access terminal (for example, access terminal 200) registering with a first base station (for example, base station 63). Processor 202 may execute program instructions of CRPI 220 to cause access terminal 200 to register with base station 63. Registering access terminal 200 may include access terminal 200 transmitting information regarding access terminal 200 to base station 63 via for a reverse-link channel. Base station 63 is operating as a currently-serving base station for access terminal 200 at the time access terminal 200 registers with base station 63. Upon registering with base station 63, base station 63 operates as a currently-registered base station for access terminal 200.

Next, block 404 includes the access terminal (for example, access terminal 200) performing an idle-mode handoff to a second base station (for example, base station 75). Block 404 is carried out while access terminal 200 is registered with the first base station (that is, base station 63). At block 404, performing the idle-mode handoff may occur in response to processor 202 determining that a strength of a pilot signal transmitted by base station 75 exceeds, by at least a handoff threshold 216, a strength of a pilot signal transmitted by base station 69.

Next, block 406 includes the access terminal (for example, access terminal 200) detecting that a strength of a pilot signal transmitted by the third base station (for example, base station 71 or base station 77) exceeds, by at least a handoff threshold, a strength of a pilot signal transmitted by the second base station (for example, base station 75). Block 406 is carried out while access terminal 200 is registered with the base station 63 and while base station 75 is a currently-serving base station for access terminal 200.

Next, block 408 includes the access terminal (for example, access terminal 200) comparing a distance between the first base station (for example, base station 63) and the third base station (for example, base station 71 or base station 77) to a registration distance associated with the first base station (for example, base station 63). Prior to making the comparison at block 408, processor 202 may determine the distance between the first base station and the third base station by executing program instructions of CRPI 220.

Next, block 410 includes, if the access terminal (for example, access terminal 200) determines that the distance between the first base station (for example, base station 63) and the third base station is greater than or equal to the registration distance associated with the first base station, then the access terminal registering with the second base station (for example, base station 75), otherwise, if the access terminal determines that the distance between the first base station and the third base station is less than the registration distance associated with the first base station, then the access terminal performing an idle-mode handoff from the second base station to the third base station. In accordance with the case in which access terminal 200 registers with the second base station, after performing that registration, access terminal 200 may perform the idle-mode handoff from the second base station to the third base station (for example, base station 77).

Figure 5:
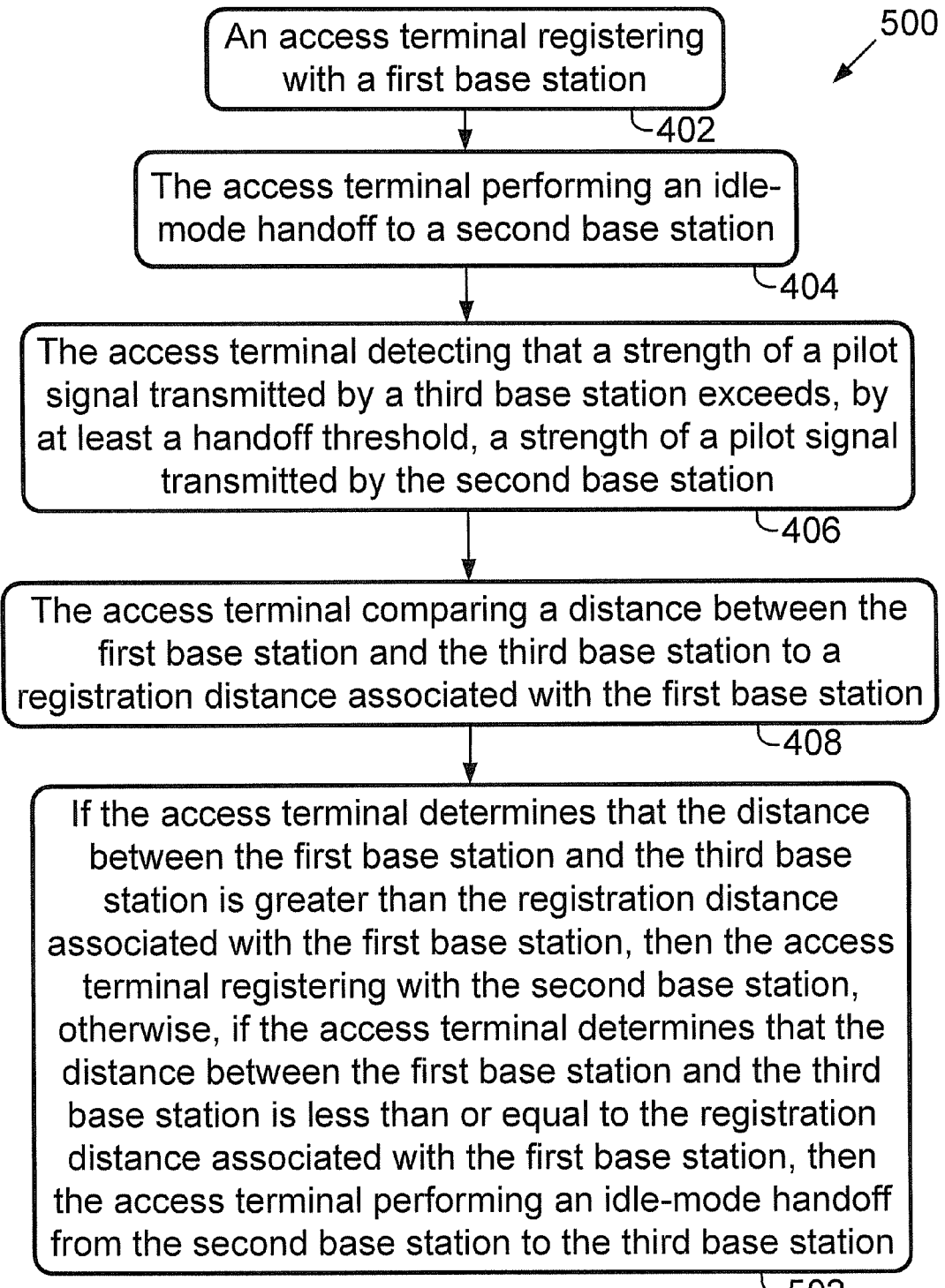
FIG. 5 is a flow chart depicting another set of functions that may be carried out in accordance with the example embodiments.

Next, FIG. 5 illustrates an example set of functions 500 that can be carried out in accordance with the example embodiments. The set of functions 500 are identified via blocks 402, 404, 406, 408, and 502. Blocks 402, 404, 406, and 408 are identical to the same numbered blocks in FIG. 4. The set of functions 500 refers to an access terminal, a first base station, a second base station, and a third base station. For purposes of describing FIG. 5, those elements referred to in FIG. 5 are referred to as access terminal 200, base station 63, base station 75, and base station 71 or 77, respectively.

Block 402 includes an access terminal (for example, access terminal 200) registering with a first base station (for example, base station 63). Processor 202 may execute program instructions of CRPI 220 to cause access terminal 200 to register with base station 63. Registering access terminal 200 may include access terminal 200 transmitting information regarding access terminal 200 to base station 63 via for a reverse-link channel. Base station 63 is operating as a currently-serving base station for access terminal 200 at the time access terminal 200 registers with base station 63. Upon registering with base station 63, base station 63 operates as a currently-registered base station for access terminal 200.

Next, block 404 includes the access terminal (for example, access terminal 200) performing an idle-mode handoff to a second base station (for example, base station 75). Block 404 is carried out while access terminal 200 is registered with the first base station (that is, base station 63). At block 404, performing the idle-mode handoff may occur in response to processor 202 determining that a strength of a pilot signal transmitted by base station 75 exceeds, by at least a handoff threshold 216, a strength of a pilot signal transmitted by base station 69.

Next, block 406 includes the access terminal (for example, access terminal 200) detecting that a strength of a pilot signal transmitted by the third base station (for example, base station 71 or base station 77) exceeds, by at least a handoff threshold, a strength of a pilot signal transmitted by the second base station (for example, base station 75). Block 406 is carried out while access terminal 200 is registered with the base station 63 and while base station 75 is a currently-serving base station for access terminal 200.

Next, block 408 includes the access terminal (for example, access terminal 200) comparing a distance between the first base station (for example, base station 63) and the third base station (for example, base station 71 or base station 77) to a registration distance associated with the first base station (for example, base station 63). Prior to making the comparison at block 408, processor 202 may determine the distance between the first base station and the third base station by executing program instructions of CRPI 220.

Next, block 502 includes, if the access terminal (for example, access terminal 200) determines that the distance between the first base station (for example, base station 63) and the third base station is greater than the registration distance associated with the first base station, then the access terminal registering with the second base station (for example, base station 75), otherwise, if the access terminal determines that the distance between the first base station and the third base station is less than or equal to the registration distance associated with the first base station, then the access terminal performing an idle-mode handoff from the second base station to the third base station. In accordance with the case in which access terminal 200 registers with the second base station, after performing that registration, access terminal 200 may perform the idle-mode handoff from the second base station to the third base station (for example, base station 77).

IV. Use of Multiple Registration Distances Per Base Station

FIG. 1 illustrates distance boundaries 110 and 120 as being circular. In accordance with an embodiment in which base station 63 is located at the center of distance boundary 110, a single registration distance may be associated with base station 63 (i.e., the radius of the circle defining distance boundary 110). Similarly, in accordance with an embodiment in which base station 75 is located at the center of distance boundary 120, a single registration distance may be associated with base station 75 (i.e., the radius of the circle defining distance boundary 120).

The registration distance associated with base station 63 may be stored as registration distance data 218 when base station 63 is the currently-registered base station for access terminal 200. Similarly, the registration distance associated with base station 75 may be stored as registration distance data 218 when base station 75 is the currently-registered base station for access terminal 200.

As an alternative to a base station being associated with a single registration distance, a base station may be associated with multiple registration distances. The multiple registration distances may define a non-circular distance boundary around the base station and/or the multiple registration distances may be determined from a non-circular distance boundary that surrounds the base station. Furthermore, a base station may switch from being associated with a single registration distance to being associated with multiple registration distances, and switch from being associated with multiple registration distances to being associated with a single registration distance. Triggers that cause such switching to be carried out may include any of a variety of triggers such as the time-of-day and base station loading conditions.

Figure 6:
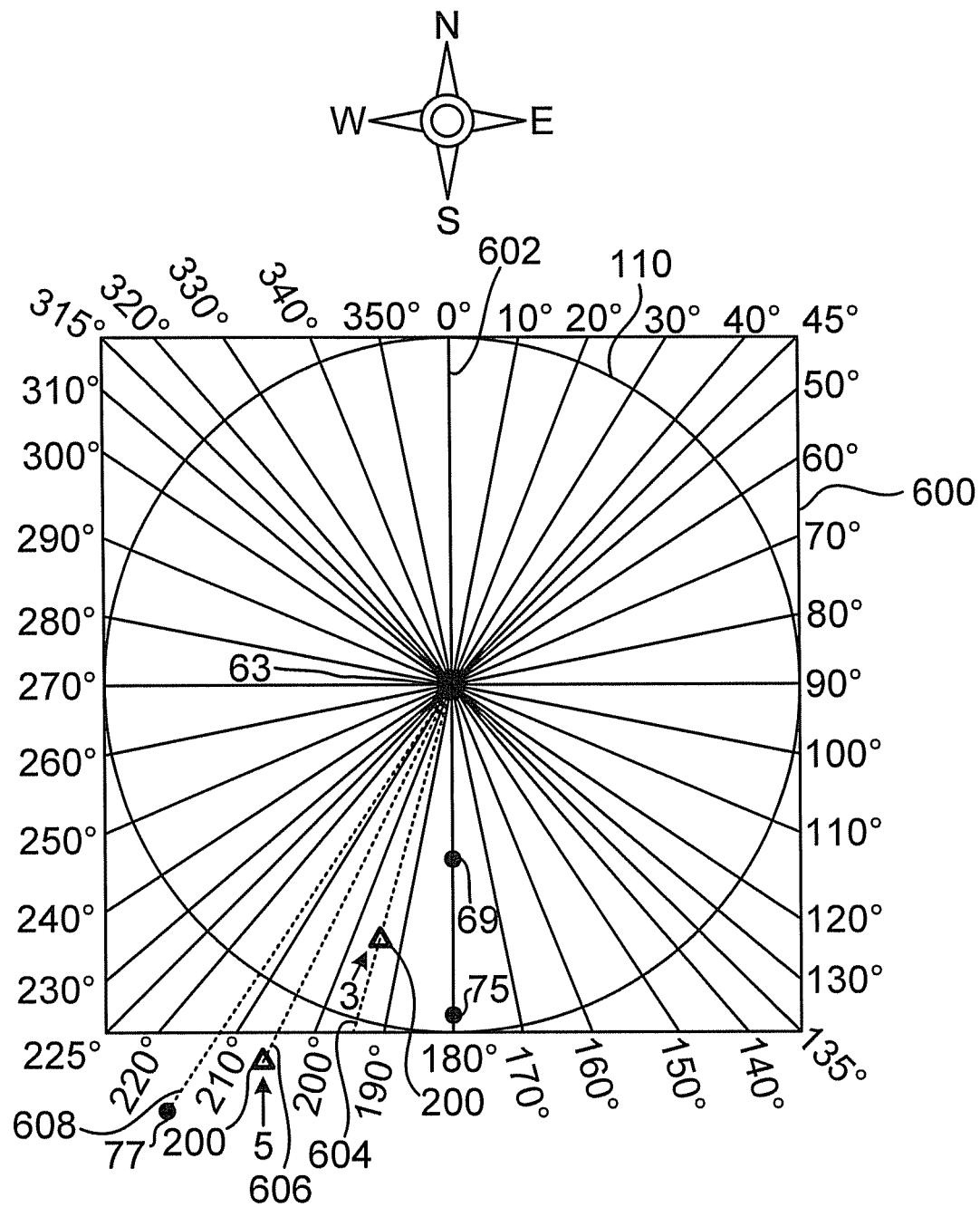
FIG. 6 illustrates an example non-circular distance boundary.

Turning to FIG. 6, that figure illustrates, among other things, base stations 63, 69, 75, and 77 and distance boundaries 110 and 600. As illustrated in FIG. 6, distance boundary 600 is rectangular, and in particular, distance boundary 600 is a rectangle with equal length sides. Base station 63 may be associated with distance boundary 600 instead of or in addition to distance boundary 110. Base station 63 may switch from using distance boundary 110 to distance boundary 600, and switch from using distance boundary 600 to distance boundary 110. Triggers that cause such switching to be carried out may include any of a variety of triggers such as the time-of-day and base station loading conditions.

FIG. 6 illustrates access terminal 200 at locations 3 and 5, a north reference line 602, rays 604, 606, and 608, and rays extending from base station 63 to degree markers that range from 0° to 350° in 10° increments. Each of the degree markers illustrated in FIG. 6 represents an azimuth (i.e., an angle) formed between the north reference line 602 and a ray starting at base station 63 and extending to distance boundary 600 or beyond. The azimuths are measured in a clockwise direction. A person having ordinary skill in the art will understand that the north reference lines and rays referred to in this description may be virtual (e.g., computer-generated).

A plurality of azimuth ranges may be defined with respect to a base station. Table 1 contains a plurality of azimuth ranges, and for each of those azimuth ranges, a respective azimuth range identifier (AR ID) and a respective registration distance. The registration distances contained in Table 1 are referred to hereinafter as registration distances 610.

TABLE 1

| AR ID | Azimuth Range (AR) | Reg. Distance |
|---|---|---|
| 1 | AR = 0° | 10 miles |
| 2 | 0° < AR ≤ 10° | 10.04 miles |
| 3 | 10° < AR ≤ 20° | 10.35 miles |
| 4 | 20° < AR ≤ 30° | 11.03 miles |
| 5 | 30° < AR ≤ 40° | 12.21 miles |
| 6 | 40° < AR ≤ 50° | 14.14 miles |
| 7 | 50° < AR ≤ 60° | 12.21 miles |
| 8 | 60° < AR ≤ 70° | 11.03 miles |
| 9 | 70° < AR ≤ 80° | 10.35 miles |
| 10 | 80° < AR < 90° | 10.04 miles |
| 11 | AR = 90° | 10 miles |
| 12 | 90° < AR ≤ 100° | 10.04 miles |
| 13 | 100° < AR ≤ 110° | 10.35 miles |
| 14 | 110° < AR ≤ 120° | 11.03 miles |
| 15 | 120° < AR ≤ 130° | 12.21 miles |
| 16 | 130° < AR ≤ 140° | 14.14 miles |
| 17 | 140° < AR ≤ 150° | 12.21 miles |
| 18 | 150° < AR ≤ 160° | 11.03 miles |
| 19 | 160° < AR ≤ 170° | 10.35 miles |
| 20 | 170° < AR < 180° | 10.04 miles |
| 21 | AR = 180° | 10 miles |
| 22 | 180° < AR ≤ 190° | 10.04 miles |
| 23 | 190° < AR ≤ 200° | 10.35 miles |
| 24 | 200° < AR ≤ 210° | 11.03 miles |
| 25 | 210° < AR ≤ 220° | 12.21 miles |
| 26 | 220° < AR ≤ 230° | 14.14 miles |
| 27 | 230° < AR ≤ 240° | 12.21 miles |
| 28 | 240° < AR ≤ 250° | 11.03 miles |
| 29 | 250° < AR ≤ 260° | 10.35 miles |
| 30 | 260° < AR < 270° | 10.04 miles |
| 31 | AR = 270° | 10 miles |
| 32 | 270° < AR ≤ 280° | 10.04 miles |
| 33 | 280° < AR ≤ 290° | 10.35 miles |
| 34 | 290° < AR ≤ 300° | 11.03 miles |
| 35 | 300° < AR ≤ 310° | 12.21 miles |
| 36 | 310° < AR ≤ 320° | 14.14 miles |
| 37 | 320° < AR ≤ 330° | 12.21 miles |
| 38 | 330° < AR ≤ 340° | 11.03 miles |
| 39 | 340° < AR ≤ 350° | 10.35 miles |
| 40 | 350° < AR < 0° | 10.04 miles |

In accordance with the example embodiments, each azimuth range may comprise (i) an azimuth range between a first number of degrees and a second number of degrees, (ii) an azimuth range between a first number of degrees and a second number of degrees and including the first number of degrees, the second number of degrees, or the first number of degrees and the second number of degrees, or (iii) a particular azimuth, such as 0°, 90°, 180°, or 270°. In Table 1, the azimuth ranges, other than a particular azimuth, cover approximately 10°, but are not so limited. For example, azimuth ranges, other than a particular azimuth, may cover a range of degrees greater than 10° (e.g., 0°<AR≤15°) or less than 10° (e.g., 0°<AR≤5°).

A registration distance that is associated with an azimuth range may be the distance between the currently-registered base station and a point on the distance boundary associated with the currently-registered base station. The point on the distance boundary, with respect to the currently-registered base station and a north reference line extending from the currently-registered base station, may, for example, form an azimuth at a mid-point of the azimuth range (e.g., an azimuth of 45° within the azimuth range of 40°<AR≤50°). Alternatively, the point on the distance boundary, with respect to the currently-registered base station and a north reference line extending from the currently-registered base station, may, for example, form an azimuth at the low end of the azimuth range (e.g., 40°), the high end of the azimuth range (e.g., 50°) or some other portion of the azimuth range other than the mid-point of the azimuth range.

Figure 7:
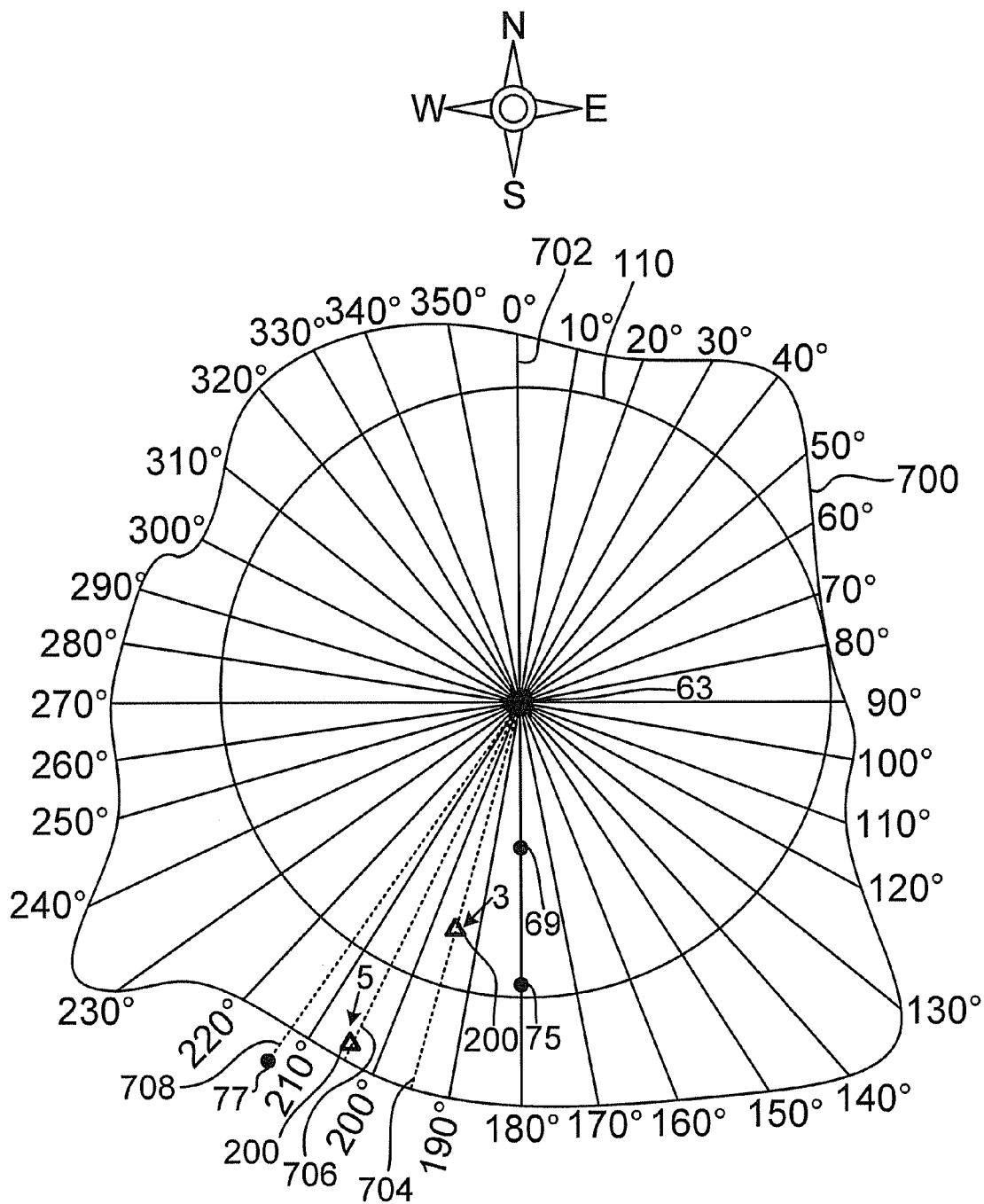
FIG. 7 illustrates another example non-circular distance boundary.

Turning to FIG. 7, that figure illustrates, among other things, base stations 63, 69, 75, and 77 and distance boundaries 110 and 700. Base station 63 may be associated with distance boundary 700 instead of or in addition to distance boundary 110. As illustrated in FIG. 7, distance boundary 700 is a non-circular closed curve.

FIG. 7 illustrates access terminal 200 at locations 3 and 5, a north reference line 702, and rays 704, 706, and 708, and rays extending from base station 63 to degree markers that range from 0° to 350° in 10° increments. Each of the degree markers illustrated in FIG. 7 represents an azimuth (i.e., an angle) formed between the north reference line 702 and a ray starting at base station 63 and extending to distance boundary 700 or beyond.

Table 2 contains a plurality of azimuth ranges, and for each of those azimuth ranges, a respective azimuth range identifier (AR ID) and a respective registration distance. The registration distances contained in Table 2 are referred to hereinafter as registration distances 710.

TABLE 2

| AR ID | Azimuth Range (AR) | Reg. Distance |
|---|---|---|
| 1 | 0° < AR ≤ 10° | 11.30 miles |
| 2 | 10° < AR ≤ 20° | 11.45 miles |
| 3 | 20° < AR ≤ 30° | 11.70 miles |
| 4 | 30° < AR ≤ 40° | 12.50 miles |
| 5 | 40° < AR ≤ 50° | 13.45 miles |
| 6 | 50° < AR ≤ 60° | 12.10 miles |
| 7 | 60° < AR ≤ 70° | 10.75 miles |
| 8 | 70° < AR ≤ 80° | 10.15 miles |
| 9 | 80° < AR < 90° | 10.00 miles |
| 10 | 90° < AR ≤ 100° | 10.30 miles |
| 11 | 100° < AR ≤ 110° | 10.80 miles |
| 12 | 110° < AR ≤ 120° | 11.25 miles |
| 13 | 120° < AR ≤ 130° | 12.60 miles |
| 14 | 130° < AR ≤ 140° | 16.25 miles |
| 15 | 140° < AR ≤ 150° | 16.35 miles |
| 16 | 150° < AR ≤ 160° | 15.10 miles |
| 17 | 160° < AR ≤ 170° | 13.85 miles |
| 18 | 170° < AR ≤ 180° | 13.75 miles |
| 19 | 180° < AR ≤ 190° | 13.65 miles |
| 20 | 190° < AR ≤ 200° | 13.65 miles |
| 21 | 200° < AR ≤ 210° | 13.65 miles |
| 22 | 210° < AR ≤ 220° | 13.55 miles |
| 23 | 220° < AR ≤ 230° | 13.75 miles |
| 24 | 230° < AR ≤ 240° | 16.90 miles |
| 25 | 240° < AR ≤ 250° | 16.15 miles |
| 26 | 250° < AR ≤ 260° | 13.85 miles |
| 27 | 260° < AR < 270° | 13.65 miles |
| 28 | 270° < AR ≤ 280° | 13.75 miles |
| 29 | 280° < AR ≤ 290° | 13.15 miles |
| 30 | 290° < AR ≤ 300° | 12.90 miles |
| 31 | 300° < AR ≤ 310° | 11.85 miles |
| 32 | 310° < AR ≤ 320° | 12.45 miles |
| 33 | 320° < AR ≤ 330° | 13.65 miles |
| 34 | 330° < AR ≤ 340° | 13.55 miles |
| 35 | 340° < AR ≤ 350° | 12.40 miles |
| 36 | 350° < AR ≤ 0° | 11.70 miles |

Depending on which distance boundary is associated with base station 63, the registrations distances 610 or 710 may be stored as registration distance data 218 when base station 63 is the currently-registered base station.

Processor 202 may execute a variety of program instructions with regard to multiple registration distances being associated with a base station. Those program instructions may be stored within data storage device 210 as CRPI 220. For example, processor 202 may execute program instructions that cause registration distance data, received from a base station, to be stored in data storage device 210.

Processor 202 may execute program instructions to determine an azimuth between a base station location and an access terminal location. The azimuth may comprise an angle, measured in a clockwise direction, between a north reference line (e.g., north reference line 602) and a ray starting at the base station location and extending to an access terminal location or beyond. As an example, the azimuth between the location of base station 63 and location 3 of access terminal 200 may be 195° and the azimuth between the location of base station 63 and location 5 of access terminal 200 may be 204.5°.

Processor 202 may execute program instructions to determine an azimuth between two base station locations, such as the location of a currently-registered base station and a target base station. The azimuth may comprise an angle, measured in a clockwise direction, between a north reference line (e.g., north reference line 602) and a ray starting at the currently-registered base station location and extending to a target base station location or beyond. As an example, the azimuth between the location of base station 63 and locations of base stations 69 and 75 is 180° and the azimuth between the location of base station 63 and the location of base station 77 is 212°.

As an example, the program instructions to determine an azimuth may include the following equations:

$$y = \sin(long2 - long1) * \cos(lat2); \quad (5)$$

$$x = \cos(lat1) * \sin(lat2) - \sin(lat1) * \cos(lat2) * \cos(long2 - long1); \quad (6)$$

If $y > 0$ and $x > 0$, then azimuth = $\arctan(y/x)$; (7)

If $y > 0$ and $x < 0$, then azimuth = $180° - \arctan(-y/x)$; (8)

If $y > 0$ and $x = 0$, then azimuth = $90°$; (9)

If $y < 0$ and $x > 0$, then azimuth = $-\arctan(-y/x)$; (10)

If $y < 0$ and $x < 0$, then azimuth = $\arctan(y/x) - 180°$; (11)

If $y < 0$ and $x = 0$, then azimuth = $270°$; (12)

If $y = 0$ and $x > 0$, then azimuth = $0°$; (13)

If $y = 0$ and $x < 0$, then azimuth = $180°$; and (14)

If $y = 0$ and $x = 0$, then the lat1, long1 = lat2, long2. (15)

For equations (5) and (6), lat1 may represent the latitude of the currently-registered base station and long1 may represent the longitude of the currently-registered base station. For those same two equations, lat2 may represent the latitude of a target base station and long2 may represent the longitude of the target base station. Alternatively, lat2 may represent the latitude of access terminal 200 and long2 may represent the longitude of access terminal 200. Other examples of equations for determining an azimuth are also possible.

Processor 202 may execute program instructions to determine (e.g., to select from among a plurality of registration distances) a particular registration distance that is associated with base station 63. For example, processor 202 may execute program instructions to determine a registration distance by comparing a determined azimuth to one or more azimuth ranges, such as the azimuth ranges contained in Table 1, so as to determine which azimuth range includes the determined azimuth. Referring to Table 1, the determined azimuth of 195° is within the azimuth range of 190°<AR≤200° and the registration distance associated with that azimuth range is 10.35 miles.

After determining the particular registration distance, the particular registration distance can be used as the registration distance referred to in blocks 408 and 410 in FIG. 4, and as the registration distance referred to in blocks 408 and 502 in FIG. 5.

Figure 8:
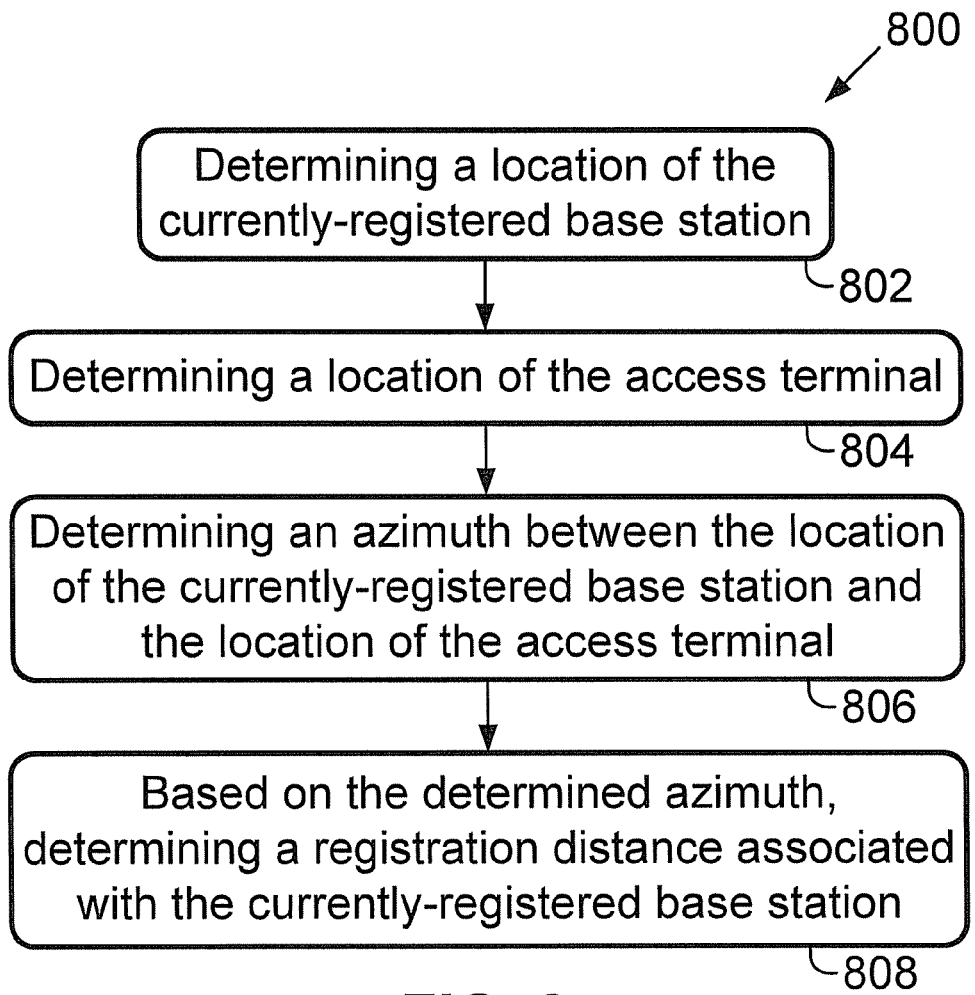
FIG. 8 is a flow chart depicting another set of functions that may be carried out in accordance with the example embodiments.

Next, FIG. 8 illustrates an example set of functions 800 that can be carried out in accordance with the example embodiments. In that regard, for example, one or more functions shown in FIG. 8 may be carried out simultaneously with a function shown in FIG. 4 and/or in between carrying out two functions shown in FIG. 4. Similarly, one or more functions shown in FIG. 8 may be carried out simultaneously with a function shown in FIG. 5 and/or in between carrying out two functions shown in FIG. 5. Furthermore, two or more functions shown in FIG. 8 may be carried out simultaneously and/or in an order other than from top to bottom as shown in FIG. 8. For purposes of describing FIG. 8, the currently-registered base station is assumed to be base station 63, and the access terminal is assumed to be access terminal 200.

Block 802 includes determining a location of the currently-registered base station (e.g., base station 63). The RF signals transmitted from base station 63 to access terminal 200, and subsequently received by RF transceiver 206, may include data associated with base station 63, and that data may include location data that identifies the latitude and longitude of base station 63, and registration distance data associated with base station 63. The registration distance data may, for example, be arranged as the registration distance data 610 or 710.

Next, block 804 includes determining a location of access terminal 200. Processor 202 may determine the location of access terminal 200 from the location information provided to processor 202 from location determination device 208. The location of access tell final 200 may be defined as the latitude and longitude of access terminal 200.

Next, block 806 includes determining an azimuth between the location of the currently-registered base station and the location of the access terminal. Processor 202 may determine the azimuth between the location of base station 63 and the location of access terminal 200. As indicated above, the azimuth between base station 63 and access terminal 200 is 195° when access terminal 200 is at location 3 and is 204.5° when access terminal 200 is at location 5.

Next, block 808 includes, based on the determined azimuth, determining a registration distance associated with the currently-registered base station. Processor 202 may execute program instructions of CRPI 220 to determine the registration distance. As an example, execution of the program instructions may cause processor 202 to compare the azimuth determined at block 806 to the azimuth ranges associated with the registration distance data so as to determine which azimuth range equals or includes the determined azimuth. Referring to Table 1, if the determined azimuth is 195°, the registration distance is 10.35 miles, and if the determined azimuth is 204.5, the registration distance is 11.03 miles.

Figure 9:
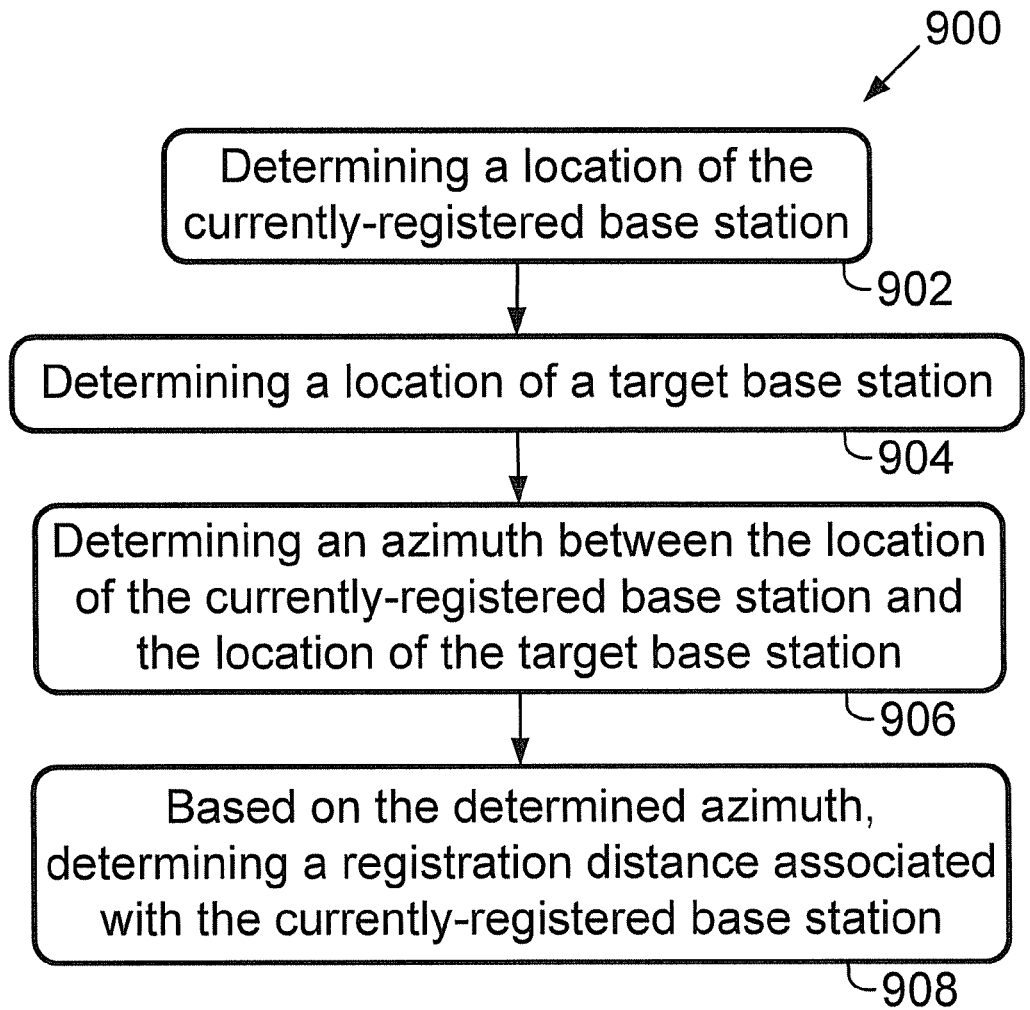
FIG. 9 is a flow chart depicting another set of functions that may be carried out in accordance with the example embodiments.

Next, FIG. 9 illustrates an example set of functions 900 that can be carried out in accordance with the example embodiments. In that regard, for example, one or more functions shown in FIG. 9 may be carried out simultaneously with a function shown in FIG. 4 and/or in between carrying out two functions shown in FIG. 4. Similarly, one or more functions shown in FIG. 9 may be carried out simultaneously with a function shown in FIG. 5 and/or in between carrying out two functions shown in FIG. 5. Furthermore, two or more functions shown in FIG. 9 may be carried out simultaneously and/or in an order other than from top to bottom as shown in FIG. 9. For purposes of describing FIG. 9, the currently-registered base station is assumed to be base station 63.

Block 902 includes determining a location of the currently-registered base station (e.g., base station 63). The RF signals transmitted from base station 63 to access terminal 200, and subsequently received by RF transceiver 206, may include data associated with base station 63, and that data may include location data that identifies the latitude and longitude of base station 63, and registration distance data associated with base station 63. The registration distance data may, for example, be arranged as the registration distance data 610 or 710.

Next, block 904 includes determining a location of a target base station. Processor 202 may determine the location of the target base station from location information received at RF transceiver 206 from the target base station. The target base station may transmit the location information to access terminal 200 via an overhead message such as a broadcast control channel message or a paging channel message. Access terminal 200 may store the location information in data storage device 210 as base station location/distance data 214. The location of the target base station may be defined as the latitude and longitude of the target base station.

Next, block 906 includes determining an azimuth between the location of the currently-registered base station and the location of the target base station. Processor 202 may determine the azimuth between the location of base station 63 and the location of the target base station. The azimuth between base station 63 and base stations 69, 75, and 77 is 180°, 180°, and 212°, respectively. Any one of base stations 69, 75, and 77, or some other base station, may be the target base station.

Next, block 908 includes, based on the determined azimuth, determining a registration distance associated with the currently-registered base station. Processor 202 may execute program instructions of CRPI 220 to determine the registration distance. As an example, execution of the program instructions may cause processor 202 to compare the azimuth determined at block 906 to the azimuth ranges associated with the registration distance data so as to determine which azimuth range equals or contains the determined azimuth. Referring to Table 1, if the determined azimuth is 180°, the registration distance is 10.00 miles, and if the determined azimuth is 212°, the registration distance is 12.21 miles.

Figure 10:
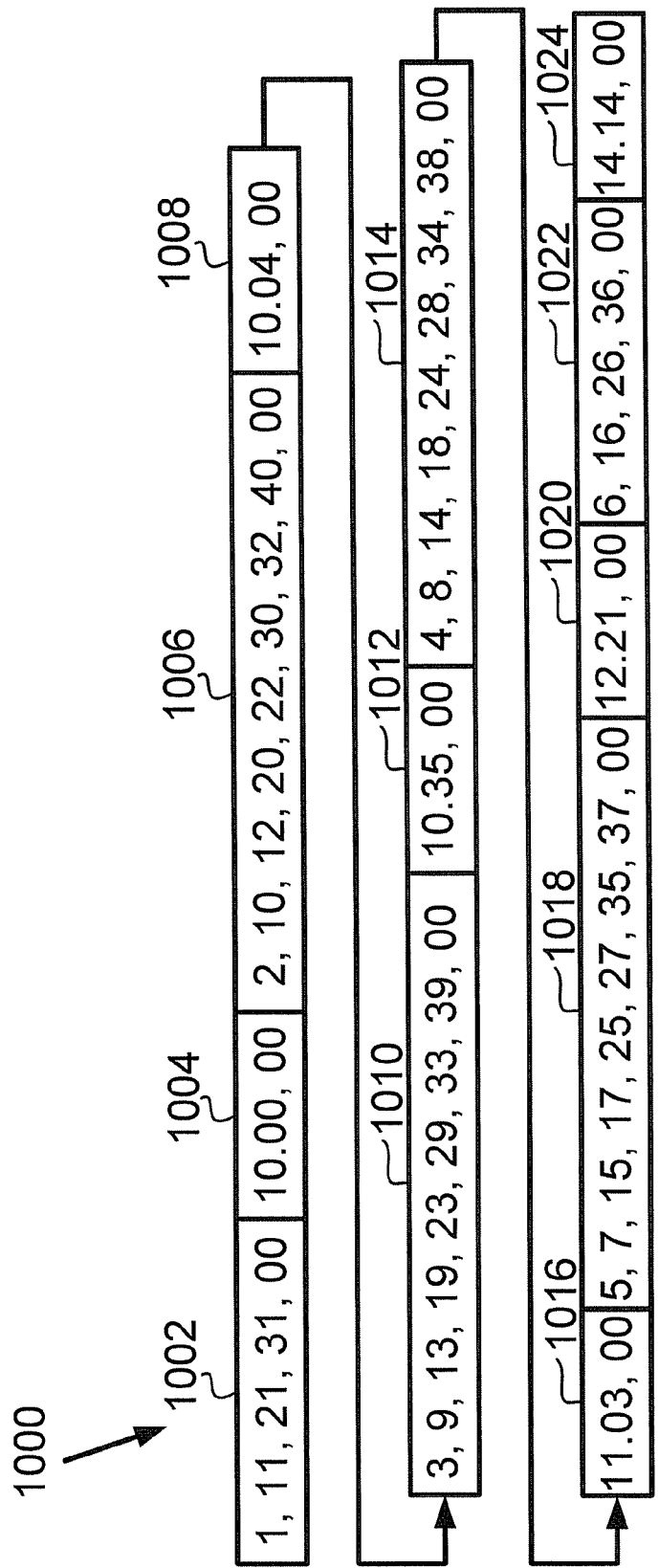
FIG. 10 illustrates an example message arrangement for transmission of registration distance data.

Next, FIG. 10 illustrates an example message arrangement 1000 for transmission of the registration distance data contained in Table 1. Message arrangement 1000 may be included in an overhead message transmitted by base station 63 via, for example, a broadcast control channel or a paging channel. Access terminal 200, as well as one or more other access terminals, may receive message arrangement 1000 via the overhead message transmission.

Message arrangement 1000 includes messages fields numbered 1002, 1004, 1006, 1008, 1010, 1012, 1014, 1016, 1018, 1020, 1022, and 1024. Each of the message fields may include one or more characters (e.g., a null character) to separate the various fields. In message arrangement 1000, a null character (e.g., an ASCII 00 (shown as '00' in FIG. 10)) is used to identify an end of each message field. Message fields 1002, 1006, 1010, 1014, 1018, and 1022 include azimuth range (AR) identifiers listed in Table 1. Message fields 1004, 1008, 1012, 1016, 1020, and 1024 include a registration distance associated with the AR identifiers contained in message fields 1002, 1006, 1010, 1014, 1018, and 1022, respectively. Other examples of message arrangements for transmitting registration distance to access terminal 200 are also possible.

Upon receiving the registration distance data from the currently-registered base station, via message arrangement 1000 or via another message arrangement, processor 202 may execute program instructions that cause the received registration distance data to be stored in data storage device 210 as registration distance data 218.

V. Conclusion

Example embodiments of the present invention have been described above. Those skilled in the art will understand that changes and modifications may be made to the described embodiments without departing from the true scope and spirit of the present invention, which is defined by the claims.

I claim:

1. A method comprising:
an access terminal registering with a first base station;
while the access terminal is registered with the first base station, the access terminal performing an idle-mode handoff to a second base station;
while the access terminal is registered with the first base station and while the second base station is a currently-serving base station for the access terminal, the access terminal detecting that a strength of a pilot signal transmitted by a third base station exceeds, by at least a handoff threshold, a strength of a pilot signal transmitted by the second base station;
the access terminal comparing a distance between the first base station and the third base station to a registration distance associated with the first base station; and
if the access terminal determines that the distance between the first base station and the third base station is greater than or equal to the registration distance associated with the first base station, then the access terminal registering with the second base station, otherwise, if the access terminal determines that the distance between the first base station and the third base station is less than the registration distance associated with the first base station, then the access terminal performing an idle-mode handoff from the second base station to the third base station.

2. The method of claim 1, further comprising:
while the access terminal is registered with the first base station but prior to the access terminal performing the idle-mode handoff to the second base station, the access terminal (i) detecting that the strength of the pilot signal transmitted by the second base station exceeds, by at least the handoff threshold, a strength of a pilot signal transmitted by a fourth base station, and (ii) determining that a distance between the first base station and the second base station is less than the registration distance associated with the first base station and then the access terminal responsively performing an idle-mode handoff from the fourth base station to the second base station.

3. The method of claim 1, further comprising, while the second base station is the currently-serving base station for the access terminal, the access terminal monitoring a forward paging channel of the second base station.

4. The method of claim 1, further comprising, while the second base station is the currently-serving base station for the access terminal, the access terminal monitoring a forward broadcast channel of the second base station.

5. The method of claim 1, further comprising, while the second base station is the currently-serving base station for the access terminal, the access terminal monitoring a forward control channel of the second base station.

6. The method of claim 1, wherein the handoff threshold comprises a dynamic handoff threshold.

7. The method of claim 1, wherein if the access terminal determines that the distance between the first base station and the third base station is greater than or equal to the registration distance associated with the first base station, the method further comprising the access terminal responsively performing an idle-mode handoff from the second base station to the third base station after the access terminal registers with the second base station.

8. The method of claim 1, further comprising:
the access terminal determining the registration distance associated with the first base station from among a plurality of registration distances associated with the first base station.

9. The method of claim 8,
wherein each registration distance of the plurality of registration distances is associated with a respective azimuth range of a plurality of azimuth ranges,
wherein an azimuth between a north reference line extending from the currently-registered base station and a ray extending from the currently-registered base station to the third base station is within a particular azimuth range of the plurality of azimuth ranges, and
wherein the registration distance associated with the first base station is associated with the particular azimuth range.

10. The method of claim 9, further comprising:
the access terminal receiving, from the currently-registered base station, a message arrangement comprising the plurality of azimuth ranges and the plurality of registration distances and responsively storing the plurality of azimuth ranges and the plurality of registration distances within a data storage device of the access terminal.

11. The method of claim 8,
wherein each registration distance of the plurality of registration distances is associated with a respective azimuth range of a plurality of azimuth ranges,
wherein an azimuth between a north reference line extending from the currently-registered base station and a ray extending from the currently-registered base station to the access terminal is within a particular azimuth range of the plurality of azimuth ranges, and
wherein the registration distance associated with the first base station is associated with the particular azimuth range.

12. An access terminal comprising:
a radio frequency (RF) transceiver that is operable to transmit communications to register the access terminal with a first base station;
a processor; and
a data storage device that contains computer-readable program instructions and a registration distance associated with the first base station,
wherein, while the access terminal is registered with the first base station, the access final is operable to perform an idle-mode handoff to a second base station,
wherein, while the access terminal is registered with the first base station and the second base station is a currently-serving base station for the access terminal, the processor is operable to execute computer-readable program instructions to detect that a strength of a pilot signal received by the RF transceiver from a third base station exceeds, by at least a handoff threshold, a strength of a pilot signal received by the RF transceiver from the second base station,
wherein the computer-readable program instructions are executable by the processor to compare a distance between the first base station and the third base station to the registration distance associated with the first base station, and
wherein if the processor determines that the distance between the first base station and the third base station is greater than or equal to the registration distance associated with the first base station, then the processor triggers the RF transceiver to transmit communications to register the access terminal with the second base station, otherwise, if the processor determines that the distance between the first base station and the third base station is less than the registration distance associated, with the first base station, then the processor triggers the access terminal to perform an idle-mode handoff from the second base station to the third base station.

13. The access terminal of claim 12, wherein the processor executes computer-readable program instructions to determine the distance between the first base station and the third base station from latitude and longitude data that represents a location of the first base station and latitude and longitude data that represents a location of the third base station.

14. The access terminal of claim 12, wherein the handoff threshold comprises a dynamic handoff threshold.

15. The access terminal of claim 12, wherein if the processor determines that the distance between the first base station and the third base station is greater than or equal to the registration distance associated with the first base station, then after the processor triggers the RF transceiver to transmit communications to register the access terminal with the second base station, the processor executes program instructions to perform an idle-mode handoff to the third base station.

16. The access terminal of claim 12, wherein the communications to register the access terminal with the second base station comprises data selected from the group consisting of (i) a location of the access terminal, (ii) a status of the access terminal, (iii) an identification of the access terminal, and (iv) a slot cycle of the access terminal.

17. The access terminal of claim 12, wherein the registration distance associated with the first base station is one of a plurality of registration distances associated with the first base station and stored in the data storage device.

18. A method comprising:
an access terminal registering with a first base station;
while the access terminal is registered with the first base station, the access terminal performing an idle-mode handoff to a second base station;
while the access terminal is registered with the first base station and while the second base station is a currently-serving base station for the access terminal, the access terminal detecting that a strength of a pilot signal transmitted by a third base station exceeds, by at least a handoff threshold, a strength of a pilot signal transmitted by the second base station;
the access terminal comparing a distance between the first base station and the third base station to a registration distance associated with the first base station; and
if the access terminal determines that the distance between the first base station and the third base station is greater than the registration distance associated with the first base station, then the access terminal registering with the second base station, otherwise, if the access terminal determines that the distance between the first base station and the third base station is less than or equal to the registration distance associated with the first base station, then the access terminal performing an idle-mode handoff from the second base station to the third base station.

19. The method of claim 18, further comprising:
while the access terminal is registered with the first base station but prior to the access terminal performing the idle-mode handoff to the second base station, the access terminal (i) detecting that the strength of the pilot signal transmitted by the second base station exceeds, by at least the handoff threshold, a strength of a pilot signal transmitted by a fourth base station, and (ii) determining that a distance between the first base station and the second base station is less than the registration distance associated with the first base station and then the access terminal responsively performing an idle-mode handoff from the fourth base station to the second base station.

20. The method of claim 18, further comprising, while the second base station is the currently-serving base station for the access terminal, the access terminal monitoring a forward paging channel of the second base station.

21. The method of claim 18, further comprising, while the second base station is the currently-serving base station for the access terminal, the access terminal monitoring a forward broadcast channel of the second base station.

22. The method of claim 18, further comprising, while the second base station is the currently-serving base station for the access terminal, the access terminal monitoring a forward control channel of the second base station.

23. The method of claim 18, wherein the handoff threshold comprises a dynamic handoff threshold.

24. The method of claim 18, wherein if the access terminal determines that the distance between the first base station and the third base station is greater than the registration distance associated with the first base station, the method further comprising the access terminal responsively performing an idle-mode handoff from the second base station to the third base station after the access terminal registers with the second base station.

25. An access terminal comprising:
a radio frequency (RF) transceiver that is operable to transmit communications to register the access terminal with a first base station;
a processor; and
a data storage device that contains computer-readable program instructions and a registration distance associated with the first base station,
wherein, while the access terminal is registered with the first base station, the access terminal is operable to perform an idle-mode handoff to a second base station,
wherein, while the access terminal is registered with the first base station and the second base station is a currently-serving base station for the access terminal, the processor is operable to execute computer-readable program instructions to detect that a strength of a pilot signal received by the RF transceiver from a third base station exceeds, by at least a handoff threshold, a strength of a pilot signal received by the RF transceiver from the second base station,
wherein the computer-readable program instructions are executable by the processor to compare a distance between the first base station and the third base station to the registration distance associated with the first base station, and
wherein if the processor determines that the distance between the first base station and the third base station is greater than the registration distance associated with the first base station, then the processor triggers the RF transceiver to transmit communications to register the access terminal with the second base station, otherwise, if the processor determines that the distance between the first base station and the third base station is less than or equal to the registration distance associated with the first base station, then the processor triggers the access terminal to perform an idle-mode handoff from the second base station to the third base station.

* * * * *